US005632146A

United States Patent [19]

Foss et al.

[11] Patent Number: 5,632,146

[45] Date of Patent: May 27, 1997

[54] LOAD SHAPING COMPRESSED AIR SYSTEM

[75] Inventors: R. Scot Foss, Charlotte, N.C.; Christopher E. Wagner, Abingden; Paul J. Glace, Lutherville, both of Md.

[73] Assignee: APT Incorporated, Annapolis Junction, Md.

[21] Appl. No.: 582,113

[22] Filed: Jan. 2, 1996

[51] Int. Cl.[6] .............................. F16D 31/02; E03B 5/00

[52] U.S. Cl. ............................... 60/410; 60/416; 137/567

[58] Field of Search ............................ 60/409, 410, 412, 60/413, 416; 137/567; 417/4, 5, 6

[56] References Cited

U.S. PATENT DOCUMENTS

| | | | |
|---|---|---|---|
| 1,132,331 | 3/1915 | Gebhardt | 60/412 |
| 2,244,384 | 6/1941 | Bissinger | 60/410 |
| 2,512,043 | 6/1950 | Stevens . | |
| 2,791,230 | 5/1957 | Schaschl . | |
| 2,815,036 | 12/1957 | De Matteo | 60/416 X |
| 3,410,293 | 11/1968 | Ernyei . | |
| 3,436,913 | 4/1969 | Muller et al. | 60/416 X |
| 3,807,422 | 4/1974 | McJones . | |
| 3,922,854 | 12/1975 | Coeurderoy | 60/413 |
| 4,112,962 | 9/1978 | Huff . | |
| 4,597,406 | 7/1986 | Loiseau et al. . | |
| 4,745,745 | 5/1988 | Hagin | 60/413 X |
| 5,197,787 | 3/1993 | Matsuda et al. | 60/413 X |

*Primary Examiner*—John E. Ryznic
*Attorney, Agent, or Firm*—William S. Ramsey

[57] ABSTRACT

This invention is a load shaping system which increases the energy efficiency of a compressed air system by eliminating activation of a trim compressor in response to a momentary increase in demand for compressed air. The load shaping system includes a load shaping tank which is supplied by one or more relatively small compressors with compressed air at a pressure higher than that in the main storage reservoir. A computer controlled load shaping valve responds to a decline in air pressure in the main storage reservoir by admitting air from the load shaping tank and by lowering the activation point for the trim compressor. The overall efficiency of the system is increased by avoiding activation of the trim compressor in response to momentary increases in compressed air demand.

13 Claims, 3 Drawing Sheets

LOAD SHAPING COMPRESSED AIR SYSTEM

BACKGROUND OF THE INVENTION

1. Field of the Invention

This invention relates to compressed air systems for providing compressed air powered tools and equipment with air from a reservoir in which the reservoir is served by two or more compressors which are activated sequentially in response to the air pressure in the reservoir.

2. Description of Related Art

Manufacturing facilities often use compressed air as means to power tools, conveyers, machines, presses, and other production equipment, henceforth designated "machinery". Compressed air customarily is produced by a compressor or compressors at a central point, stored in a reservoir, and piped to the production equipment.

The demand for compressed air often varies radically over a working day, with fluctuations reflecting rest breaks, lunch periods, and the start-up or shut-down of production lines.

In order to meet a fluctuating demand for compressed air, two or more compressors are used, with the base compressor or compressors in operation constantly, and a trim compressor activated when demand reaches a preset level, as indicated by a decline in the air pressure in the reservoir to a minimum level. The number of base compressors may vary from 1 to as many as 9 or more, depending on the level of demand for compressed air. In all plants excess capacity is designed into the compressed air system, i.e. the compressed air production of the base and trim compressors combined exceeds the maximum demand for compressed air by the machinery.

Such an operation is often inefficient as the trim compressor may be activated and shortly thereafter unloaded to meet a small or transient increase in compressed air demand. Activation of a trim compressor to meet a small demand for compressed air is inefficient with respect to power consumption, a very large expenditure of power is required to meet a small demand for compressed air. In addition, activation is expensive in terms of wear on the trim compressor and associated maintenance and replacement costs.

This invention is a system which accommodates momentary fluctuations of demand without the expensive activation of a trim compressor.

U.S. Pat. No. 2,512,043 discloses a system in which compressed air is supplied from a reservoir which is replenished by a compressor. If a momentary demand causes a drop of the air pressure in the reservoir, the system automatically draws compressed air from an emergency reservoir, which is then replenished by the compressor.

U.S. Pat. No. 2,791,230 discloses apparatus for automatically insuring a continuous supply of gas from a series of cylinders. The cylinders are exhausted of gas sequentially. The system involves an arrangement of cylinders, tubing, and valves in which the electrical sensing of decreased pressure in a cylinder energizes a solenoid valve which opens a reserve cylinder.

U.S. Pat. No. 3,807,422 discloses a system in which a single compressor is used to charge a series of tanks. The system maximizes the available pressure in the tanks by charging the tank with the highest residual pressure first and withdrawing from the tanks with the lowest residual pressure first.

U.S. Pat. No. 4,597,406 discloses a device for delivery of gas under constant pressure from either of two vessels. The output gas pressure is controlled by a single pressure regulator. The system is designed to supply the output from one operative vessel while the other is on standby. Electrical switches and valves control the connection of each vessel with the output line.

The prior art disclosures do not achieve the function of the present invention, that of providing machinery with an adequate supply of compressed air at a satisfactory pressure while minimizing the consumption of power by the trim compressor.

SUMMARY OF THE INVENTION

This invention, termed the load shaping system, is an expression of the load shaping concept. When a compressed air system is faced with an instantaneous demand, the load shaping concept provides for a burst of energy in the form of compressed air in order to prevent wasteful activation of the trim compressor. The load shaping concept acts in a manner analogous to that of a capacitor in an electrical system. It uses compressed air from a secondary reservoir to spare activation of the trim compressor.

In discussing the operation of compressed air systems, it is useful to distinguish between compressed air pressure and compressed air flow. Compressed air pressure is expressed in pounds per square inch (psi). Compressed air flow is expressed in cubic feet per minute (cfm). A compressor will produce a certain volume of compressed air in cfm at a certain pressure in psi. A piece of machinery will consume or demand a certain volume or flow of air in cfm at a certain pressure in psi.

In a compressed air system, the compressors will fill the main storage reservoir at a certain pressure in psi. The demand or flow in cfm is a function of the number and consumption rate of the individual pieces of machinery which consume the compressed air, each piece of machinery consuming a certain flow of compressed air in cfm at a certain psi.

In a factory compressed air system the main storage reservoir contains compressed air at a preset pressure such as 110 psi. This pressure is higher than the optimum operating pressure for the machinery, which may be 85 psi. Regulators are used to reduce the pressure of compressed air provided to the machinery from 110 psi to the optimum operating pressure of 85 psi. This arrangement insures that the machinery always receives compressed air at a pressure adequate for the efficient operation of the machinery. In addition, it avoids the wasteful operation of machinery using compressed air at a pressure higher than the optimum pressure for the machinery.

A typical factory compressed air system has two air compressors of 500 hp capacity, a main storage reservoir of 5,000 gal. capacity which contains compressed air at 110 psi, and piping and regulators which provide machinery with compressed air at a regulated minimum pressure of 85 psi. In a typical system, a single base compressor is in operation all of the time the factory is operating, and the trim compressor is activated when the air pressure in the main storage reservoir drops below a preset pressure termed the add point, 100 psi in this example. The trim compressor is inactivated when the air pressure in the main storage reservoir is restored to a preset value, termed the delete point, 110 psi in this example.

Instantaneous or momentary increases in the demand for compressed air, due to increased usage machinery which accompanies the work day schedule or the production schedule, often activates the trim compressor to accommodate a relative small increase in demand for compressed air. This causes wasteful and inefficient cycling of the trim compressor.

The load shaping system of this invention prevents the wasteful and inefficient cycling of the trim compressor. The load shaping system incorporates a large reservoir, called the load shaping tank, of 20,000 gal in the above example, which accommodates the instantaneous demand. This system provides compressed air at a pressure, 175 psi in the example, which is higher than that in the main storage reservoir. Compressed air is released from the load shaping tank into the factory system via a computer controlled load shaping valve. The computer also controls the preset pressure level of the add point.

The load shaping tank is substantially greater in capacity than the main storage air reservoir. Because of the large capacity of the load shaping tank, and because of the instantaneous and momentary nature of the demand increases which are accommodated, the load shaping tank may be replenished using one or more relatively small secondary compressors. Each of the two secondary compressors in the above example have a power rating of 10 hp. The load shaping system less the load shaping tank and piping associated with connections to the factory compressed air system is produced as a modular load shaping unit.

A computer controls the activation and unloading of the main, trim and secondary compressors.

The load shaping system thus uses a relatively large load shaping tank and relatively small compressors to provide an efficient response to instantaneous or momentary demand for compressed air. This provides both energy savings and reduction of unnecessary wear on and maintenance of the trim compressor. The energy and expense savings associated within use of the load shaping system under typical factory conditions are substantial.

The objective of this system is to conserve energy in a compressed air system by minimizing the activation of the trim compressor while fulfilling all demands for compressed air.

Another objective of this system is to minimize the wear and tear on the trim compressor while fulfilling all demands for compressed air.

Another objective of this system is to supply a compressed air system with cooled, dried air.

Another objective of this system is to minimize the number of activation unloading cycles experienced by the trim compressor.

Another objective of this system is to provide a load shaping unit which may be installed with one single electrical contractor connection and a minimum of mechanical connections.

A final objective of this system is to provide means for compressor management which saves energy and has a minimal impact on the environment.

DESCRIPTION OF THE PREFERRED EMBODIMENTS

Figure 1:
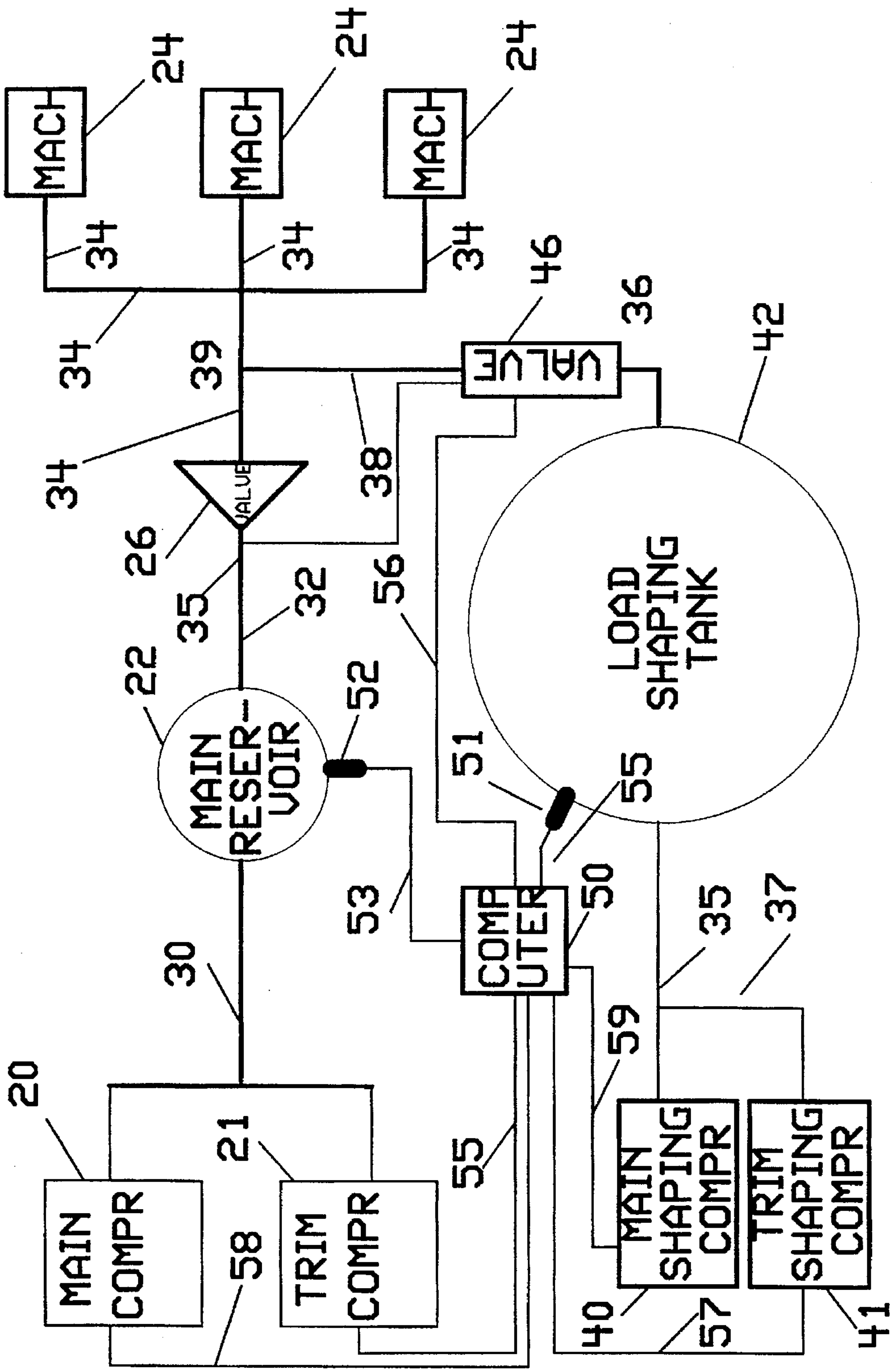
FIG. 1 is a diagrammatical representation of a factory compressed air system equipped with a load shaping system.

FIG. 1 is a diagrammatical representation of a factory compressed air system equipped with a load shaping system. Compressed air to the factory compressed air system is provided by a large 500 hp main compressor 20 and a large 500 hp trim compressor 21. The main compressor is activated continuously during periods of compressed air demand, and the trim compressor is activated and unloaded to accommodate fluctuating demand for compressed air.

In this disclosure reference is made to "activating" and "unloading" the trim compressor. The starting of the electric motor of a large trim compressor creates a large momentary electrical power demand and generates considerable heat in the compressor motor. This increases the wear on the compressor motor; accordingly, it is desirable to minimize the number of on and off cycles of a trim compressor motor. For this reason, compressors are equipped with a clutch to engage or disengage the compressor pump without turning off the compressor motor.

The term "activating" means causing the compressor to produce compressed air, either by turning on the compressor motor and engaging the compressor pump or by engaging the compressor pump to an already running compressor motor. The term "unloading" means causing the compressor to cease producing compressed air, either by turning off the compressor motor or by disengaging the compressor pump without turning off the compressor motor. It will be readily understood that a motor operating with an engaged compressor pump (which is producing compressed air) will consume power at a substantially greater rate than a motor operating with a disengaged compressor pump.

Trim compressor motors are routinely idled with the compressor pump disengaged for a minimum of 10 to 30 min. while unloaded before the motors are turned off.

The main and trim compressors are connected by piping 30 and 31, respectively, to the 5,000 gal. main storage reservoir 22. Piping 32 leads from the main storage reservoir to one or more demand expander valves 26. The compressed air pressure within the main storage reservoir fluctuates from 89 psi to 110 psi. The demand expander valve provided compressed air to the machinery 24 at a controlled constant pressure of 85 psi. Piping 34 leads from the demand expander valve 26 to the individual items of machinery 24 which are powered by compressed air. The demand expander valve reduces the compressed air pressure from that in the main storage reservoir to that adequate for efficient operation of the machinery.

In the conventional operations of the compressed air system, a compressed air pressure sensor 52 which measures the compressed air pressure inside the main storage reservoir 22 is connected by a wire 54 to the computer 50 which is connected by wire 55 to the trim compressor 21. The computer 50 is connected by wire 58 to the main compressor 20. When the compressed air pressure in the main storage reservoir falls below a preset add point of 100 psi the trim compressor 21 is activated. When the compressed air pressure in the main storage reservoir exceeds a preset delete point of 110 psi the trim compressor 21 is unloaded.

The following elements constitute the load shaping system. A relatively small 10 hp main load shaping compressor 40 and a relatively small 10 hp trim load shaping compressor 41 provide compressed air at 175 psi to a relatively large 20,000 gal. load shaping tank 42 via piping 35 and 37, respectively. Compressed air flows through piping 36 to a load shaping valve 46. In the first embodiment load shaping system compressed air from the load shaping valve 46 flows by piping 38 to piping 34 at junction 39.

In the second embodiment load shaping system compressed air from the load shaping valve 46 flows by piping 37 to piping 32 at junction 35. It is preferred to route the compressed air from the load shaping valve to piping 34 as in the first embodiment because the pressure differential between the load shaping tank 42 and piping 34 is 175 psi minus 85 psi or 90 psi. This pressure differential is greater than that in the second embodiment between the load shaping tank 42 and piping 32 which is 175 psi minus 110 psi or 65 psi. Because of the greater pressure differential, more compressed air may be delivered to piping 34 in the first embodiment than to piping 32 in the second embodiment.

Computer 50 is connected by wire 53 to main storage reservoir compressed air pressure sensor 52, by wire 58 to main compressor 20, by wire 55 to trim compressor 21, by wire 59 to main load shaping compressor 40, by wire 55 to load shaping tank compressed air pressure sensor 51, by wire 57 to trim load shaping compressor 41, and by wire 56 to load shaping valve 46.

The main and trim load shaping compressors are activated and unloaded by the computer.

There is no absolute requirement that the capacity of the load shaping tank be larger than that of the main storage reservoir, although the larger the load shaping tank is with respect to the main storage reservoir, the more effective the load shaping system will be in sparing activation of the trim compressor. A preferred range of ratio of capacities of main storage reservoir:load shaping tank is 1:1 to 1:10.

In the first embodiment it is necessary that the pressure in the load shaping tank be higher than the pressure in the piping connecting the demand expander valve with the air-powered machinery. A preferred range of ratio of pressures in the load shaping tank:piping connecting the demand expander valve with the air-powered machinery is 1.01:1 to 10:1.

In the second embodiment it is necessary that the pressure in the load shaping tank be higher than the pressure in the piping connecting the main storage reservoir with the demand expander valve. A preferred range of ratio of pressures in the load shaping tank:piping connecting the main storage reservoir with the demand expander valve is 1.01:1 to 10:1.

It will be understood that the sizes of components and the compressed air pressures of the component parts described above are illustrative of a functional system. Other component sizes and compressed air pressures may be used.

Figure 2:
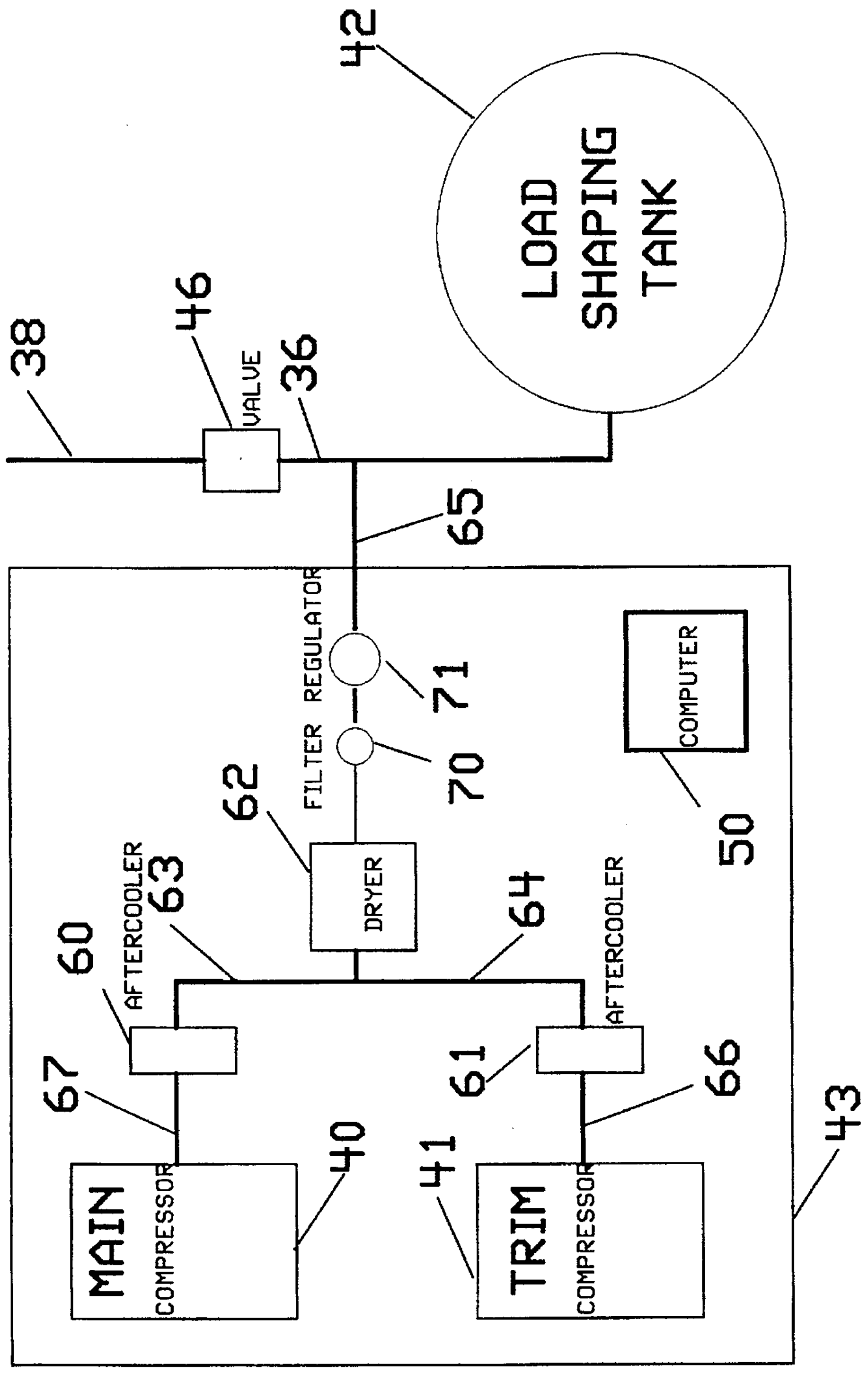
FIG. 2 is a diagrammatical representation of a modular load shaping unit and a load shaping tank.

FIG. 2. is a diagrammatical representation of the load shaping system in a preferred embodiment. This embodiment includes air cooled aftercoolers and a refrigerated air dryer which are not essential to the load shaping system but which are desirable in providing high quality compressed air i.e. compressed air having a low humidity and relatively low temperature.

FIG. 2 shows a modular load shaping unit 43 which with the load shaping tank 42 and associated piping 65, 36, and 38, and load shaping valve 46 constitute the load shaping system.

The load shaping unit 43 consists of a base 42 and the following components mounted on the base: a main load shaping compressor 40, a trim load shaping compressor 41, air cooled aftercoolers 60 and 61, one refrigerated air dryer 62, a computer 50, and a coalescing filter 70. A back pressure regulator 71 keeps the dryer pressurized to a minimum 150 psi and the velocity within design limits when the tank pressure is low. Wire connections to the computer, gauges, and relief valves are not shown. Piping 67 and 66 connect compressors 40 and 41 with aftercoolers 61 and 61, respectively. Piping 63 and 64 connect aftercoolers 60 and 61, respectively with air dryer 62. Piping 65 connects with piping 36 which connects the load shaping valve 46 with the load shaping tank 42. Piping 38 leads from the load shaping valve 46 to the factory compressed air system as depicted in FIG. 1.

The load shaping unit 43 provides pre-packaged means for efficiently adding a load shaping system to an existing factory compressed air system. A load shaping tank 42 and associated piping 36 and 65 are custom installed in the user's plant. The load shaping unit 43 and load shaping valve 46 then may be installed making a minimum number of electrical contractor connection and mechanical connections.

Figure 3:
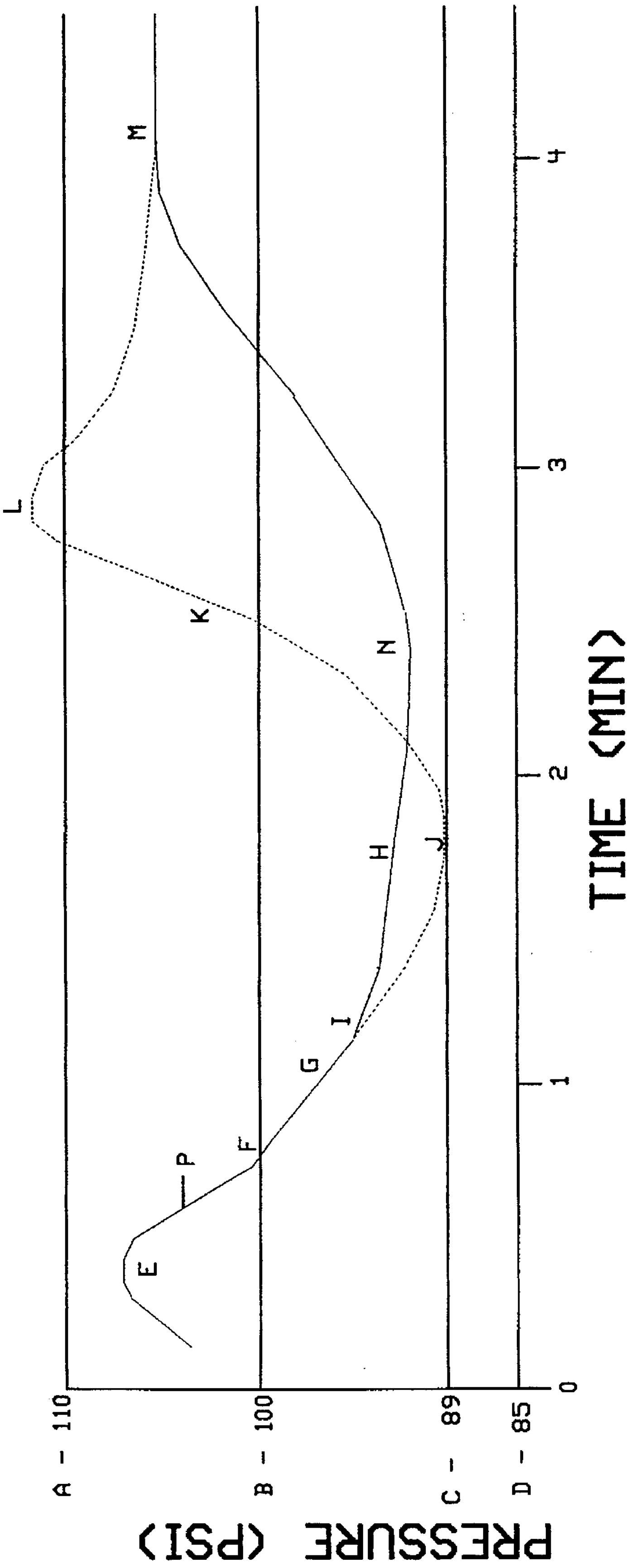
FIG. 3 is a diagram of the pressure in a main storage reservoir during the operation of the load shaping system.

FIG. 3 shows the operation of the load shaping system with reference to the compressed air pressure inside the main storage reservoir. The vertical axis indicates the compressed air pressure inside the main storage reservoir in psi. The horizontal axis indicates time in minutes (min). Line P indicates the compressed air pressure inside the main storage reservoir. The actual compressed air pressures and times used in FIG. 3 are merely representative. Actual pressures and times will vary depending on the specific installation.

In the absence of a load shaping system, one or more base compressors operate continuously and continually add compressed air to the main storage reservoir. At the same time, machinery are continually withdrawing compressed air from the main storage reservoir. A trim compressor is used to accommodate fluctuations in the demand for compressed air. The trim compressor is turned off when the compressed air pressure within the main storage reservoir reaches level A, the delete point at 110 psi. The compressed air pressure within the main storage reservoir may decline due to an increase in demand, and when it reaches level F, the add point, at 100 psi, the trim compressor is turned on. This cycle is repeated as the compressed air pressure within the main storage reservoir fluctuates between 100 and 110 psi.

A compressed air system which includes a load shaping system differs from the above system in two important aspects. 1. The add point at which the trim compressor is turned on is shifted downward. The new add point is called the expanded set point. 2. Compressed air from the load shaping tank is used to forestall turning on the trim compressor. Both of these differences are controlled by the computer.

The computer uses information about the volumetric capacity of the main storage reservoir plus associated piping and the rate of change in compressed air pressure in the main storage reservoir to compute the volumetric capacity of compressed air remaining in storage in the main storage reservoir. The computer opens the load shaping valve to add compressed air from the load shaping tank to the compressed air system in order to moderate the rate of decline of compressed air pressure in the main storage reservoir, as in point G, with the goal of stabilizing the compressed air pressure in the main storage reservoir, as in point H. The slope at point H indicates a decline in the compressed air pressure at a very moderate rate. In most cases, the momentary increase in compressed air demand will cease and the compressed air pressure will begin to increase as at point N. The load shaping valve is closed whenever pressure begins to increase within the main storage reservoir. In the I-H-N-M leg of line P, the momentary increase in compressed air demand ceases, and the pressure in the main storage reservoir gradually increases until it levels off at M.

In some cases, however, the increase in compressed air demand is sustained, as depicted by the I-J-K-L-M leg of line P. Here the pressure within the main storage reservoir continues to decrease and approaches the alert level, which is point C, here at 89 psi. The alert level is set by the computer at a pressure within the main storage reservoir which will enable activation of the trim compressor in time to provide additional pressure to the main storage reservoir with a safety factor above the expanded set point of 85 psi. In this case the alert level is set at 89 psi. The pressure in the main storage reservoir cannot be allowed to reach 85 psi because that is the pressure at which the machinery operates. If the pressure in the main storage reservoir reached 85 psi, no compressed air would flow from the main storage reservoir to the machinery.

The computer calculates the rate of fall of air pressure in the main storage reservoir and activates the trim compressor in time to prevent drop of the pressure to the alert point as at J. When the trim compressor is activated, the pressure in the main storage reservoir rapidly increases as at K until it reaches the delete point at 110 psi, at point L, when the trim compressor in unloaded. The air pressure in the main storage reservoir then drops, and, if the demand is constant, may reach a level point as in M.

The computer may activate the trim compressor in response to a predetermined slope of the pressure line. This mode is useful when a large and sustained demand for compressed air may be anticipated. Such a demand might accompany addition of a assembly line, for example. Activation of the trim compressor in response to such a large demand spares the load shaping system for use when more effective, in response to momentary fluctuations in demand for compressed air.

The purpose and effect of the load shaping system is to delay or avoid activating the trim compressor in response to momentary increase in compressed air demand, thereby increasing the energy efficiency of the system, and postponing maintenance of the trim compressor.

It will be apparent to those skilled in the art that the examples and embodiments described herein are by way of illustration and not of limitation, and that other examples may be used without departing from the spirit and scope of the present invention, as set forth in the appended claims.

We claim:

1. A load shaping system for a compressed air system, said compressed air system comprising one or more base compressors for continuous operation in providing compressed air to the main storage reservoir, a trim compressor for intermittent operation in providing compressed air to a main storage reservoir, a main storage reservoir in which compressed air is stored and which provides air to air-powered machinery, piping means connecting said compressors to said main storage reservoir, a demand expander valve for reducing the pressure of compressed air for delivery to said air-powered machinery to a preset pressure lower than that in the main storage reservoir, piping means connecting said main storage reservoir with said demand expander valve, piping means connecting said demand expander valve with said air-powered machinery, sensory means for determining the compressed air pressure in said main storage reservoir, control means for starting said trim compressor in response to the fall of said compressed air pressure level in said main storage reservoir below a preset add level, and control means for stopping said trim compressor in response to the rise of compressed air pressure in said main storage reservoir above a preset delete value, said load shaping system comprising:

a load shaping tank, at least one load shaping compressor for providing compressed air to said load shaping tank, piping means connecting said load shaping compressor and said load shaping tank, control means for maintaining compressed air pressure in said load shaping tank at a pressure greater than the pressure in said piping connecting said demand expander valve with said air-powered machinery, a load shaping valve for control of delivery of compressed air from said load shaping tank to said piping means connecting said demand expander valve with said air-powered machinery, piping means connecting said load shaping tank and said load shaping valve, piping means connecting said load shaping valve and said piping means connecting said demand expander valve with said air-powered machinery, calculating means for calculating the changes in air pressure within said main storage reservoir, for lowering said add level, and for controlling said load shaping valve, connector means connecting said primary reservoir sensor means with said calculating means, connector means connecting said calculating means with said load shaping valve, and connector means connecting said calculating means with said trim compressor.

2. The load shaping system of claim 1 wherein the ratio of capacities of said main storage reservoir:load shaping tank is 1:1 to 1:10.

3. The load shaping system of claim 1 wherein the ratio of pressures in the load shaping tank:piping connecting said demand expander valve with said air-powered machinery is 1.01:1 to 10:1.

4. The load shaping system of claim 1 wherein said load shaping compressor and said calculating means are mounted on a base.

5. The load shaping system of claim 4 further comprising a trim load shaping compressor, an air cooled aftercooler, a refrigerated air dryer a coalescing filter, and a back pressure regulator, all mounted on said base.

6. The load shaping system of claim 1 wherein said calculating means is a computer.

7. A load shaping system for a compressed air system, said compressed air system comprising one or more base compressors for continuous operation in providing compressed air to the main storage reservoir, a trim compressor for intermittent operation in providing compressed air to a main storage reservoir, a main storage reservoir in which compressed air is stored and which provides air to air-powered machinery, piping means connecting said compressors to said main storage reservoir, a demand expander valve for reducing the pressure of compressed air for delivery to said air-powered machinery to a preset pressure lower than that in the main storage reservoir, piping means connecting said main storage reservoir with said demand expander valve, piping means connecting said demand expander valve with said air-powered machinery, sensory means for determining the compressed air pressure in said main storage reservoir, control means for starting said trim compressor in response to the fall of said compressed air pressure level in said main storage reservoir below a preset add level, and control means for stopping said trim compressor in response to the rise of compressed air pressure in said main storage reservoir above a preset delete value, said load shaping system comprising:

a load shaping tank, at least one load shaping compressor for providing compressed air to said load shaping tank, piping means connecting said load shaping compressor and said load shaping tank, control means for maintaining compressed air pressure in said load shaping tank at a pressure greater than the pressure in said piping connecting said main storage reservoir with said demand expander valve, a load shaping valve for control of delivery of compressed air from said load shaping tank to said piping means connecting said main storage reservoir with said demand expander valve, piping means connecting said load shaping tank and said load shaping valve, piping means connecting said load shaping valve and said piping means connecting said main storage reservoir and said demand expander valve, calculating means for calculating the changes in air pressure within said main storage reservoir, for lowering said add level, and for controlling said load shaping valve, connector means connecting said primary reservoir sensor means with said calculating means, connector means connecting said calculating means with said load shaping valve, and connector means connecting said calculating means with said trim compressor.

8. The load shaping system of claim 7 wherein the ratio of capacities of said main storage reservoir:load shaping tank is 1:1 to 1:10.

9. The load shaping system of claim 7 wherein the ratio of pressures in the load shaping tank:piping connecting said main storage reservoir with said demand expander valve is 1.01:1 to 10:1.

10. The load shaping system of claim 7 wherein said load shaping compressor and said calculating means are mounted on a base.

11. The load shaping system of claim 10 further comprising a trim load shaping compressor, an air cooled aftercooler, a refrigerated air dryer a coalescing filter, and a back pressure regulator, all mounted on said base.

12. The load shaping system of claim 7 wherein said calculating means is a computer.

13. A process for minimizing the activation of the trim compressor in a compressed air system comprising one or more base compressor and a trim compressor which together provide compressed air to a main storage reservoir, said trim compressor being turned on when the compressed air pressure in said main storage reservoir drops below a preset add level and said trim compressor being turned off when said pressure exceeds a preset delete level, comprising lowering said add level, detecting said pressure in said main storage reservoir at a level below said delete level, and opening a load shaping valve to allow compressed air to flow from a load shaping tank into said compressed air system.

* * * * *